J. R. CASPER.
MILK BOTTLE HOLDER.
APPLICATION FILED SEPT. 5, 1914.
1,158,983.
Patented Nov. 2, 1915.
2 SHEETS—SHEET 1.
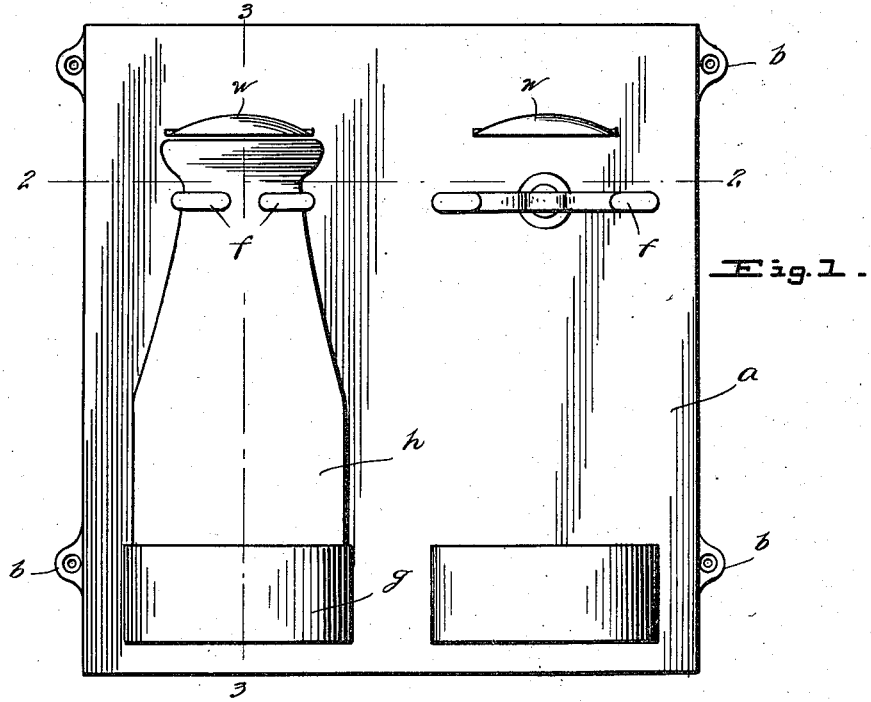
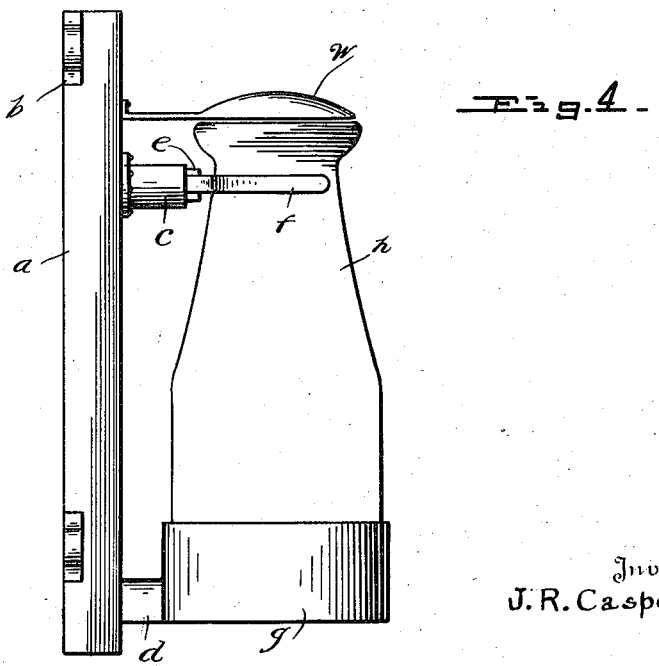
Inventor
J. R. Casper J. R. CASPER.
MILK BOTTLE HOLDER.
APPLICATION FILED SEPT. 5, 1914.
1,158,983.
Patented Nov. 2, 1915.
2 SHEETS—SHEET 2.
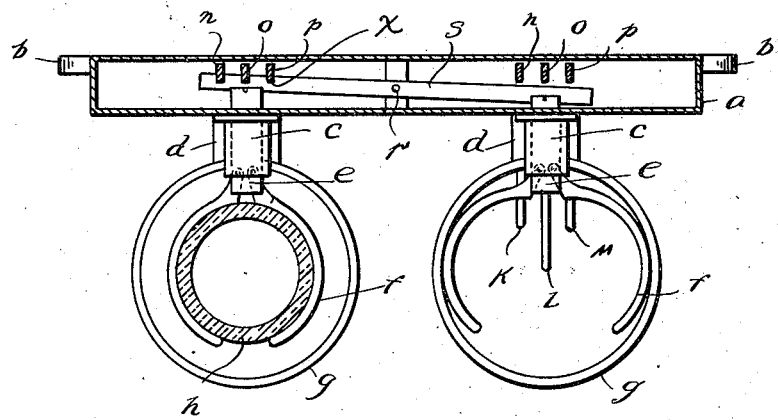
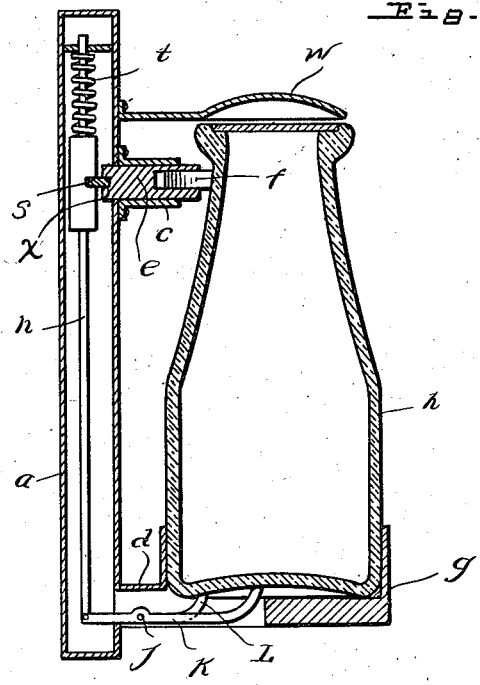

UNITED STATES PATENT OFFICE.

JOHN ROBERT CASPER, OF WASHINGTON, DISTRICT OF COLUMBIA.

MILK-BOTTLE HOLDER.

1,158,983.  Specification of Letters Patent.  Patented Nov. 2, 1915.

Application filed September 5, 1914. Serial No. 860,361.

*To all whom it may concern:*

Be it known that I, JOHN ROBERT CASPER, a citizen of the United States, residing at Washington, District of Columbia, have invented certain new and useful Improvements in Milk-Bottle Holders, of which the following is a specification.

This invention relates to new and useful improvements in milk bottle receptacle and more particularly to that type of receptacle adapted to prevent the theft of milk after it has been left at the door of the consumer.

An object of the invention is to provide means for insuring to the retailer the return of his empty bottles.

A further object is to prevent the mixing of bottles in exchange by the retailer.

Other and further objects will be hereinafter set forth in the description of my device which briefly consists of a receptacle which is adapted to receive and hold in locked position a milk bottle which bottle can only be removed by the insertion of a second bottle having a predetermined bottom contour as is fully set forth in the following description and shown in the accompanying drawings on which—

Figure 1 is a front elevation showing my device, Fig. 2 is a section taken on the line 2—2 of Fig. 1, Fig. 3 is a section on the line 3—3 of Fig. 1, Fig. 4 is a side elevation of the device as shown in Fig. 1.

Referring to the drawings in which like characters denote like parts throughout $a$ is a casing adapted to be secured to the door or door jamb by means of screws or the like extending through the openings in the ears $b$. Secured to the outer portion of the casing are tube like extensions $c$. Vertically below the members $c$ are hollow members $d$ to which are secured in any suitable manner base supports $g$ adapted to receive and support the base of a milk bottle $h$. Slidably mounted within the tube extensions $c$ are short shafts $e$ to which are pivotally secured pairs of arms $f$ respectively. These arms are so designed that when the short shaft is forced inwardly the arms close about the neck of the bottle.

Pivoted in the hollow member $d$ at $j$ are levers K, L, and M. One end of these levers extends into the casing $a$ where they are pivoted to tumblers $n$, $o$, and $p$. The tumblers are provided with notches as at $x$. The levers K, L, and M are connected to tumblers $n$, $o$, and $p$. The free ends of the levers extend through openings in the base supports $g$ and are adapted to contact the bottom of the bottle as it is being placed in position.

Pivoted at $r$ to the casing $a$ is a bar $s$. The ends of this bar are pivotally connected to the short shafts $e$. The bar $s$ is so arranged that when one end thereof enters the notches $x$ the other end swings clear forcing the short shaft outwardly and opening the arms which engage the neck of the bottle.

Springs $t$ on the tumblers serve to hold the outer ends of the levers in raised position. The bottom of the bottle having been given a predetermined contour the levers are so designed that when the bottle is placed in position as in the support $g$ the notches in the tumblers $n$, $o$ and $p$ aline and the short shaft $e$ may be pushed inwardly the arms $f$ gripping the neck of the bottle the adjacent end of the bar $s$ entering the notches. The opposite end of the bar swings outwardly carrying with it the corresponding short shaft $e$ and allowing the jaws $f$ to open. As the bottle is removed from the support $g$ the free ends of the intermediate members K, L and M are raised by the action of the springs $t$ and the notches in the tumblers $n$, $o$, and $p$ no longer aline so that the short shaft $e$ cannot be forced back. To remove a bottle from the grip of the jaws $f$ the action is reversed.

It will be seen that I have devised a receptacle by which it becomes impossible to remove one bottle without inserting one similar to it, that is to say having a similar bottom contour, thus preventing mixing of the bottles of the different dealers as each dealer can have a bottle with a different bottom contour, also one that will prevent the theft of bottles full or empty.

To prevent rain from settling in the top of the bottles I provide caps $w$ therefor although these of course are not necessary to the operation of my device.

Having now described my invention what I claim and desire to secure by Letters Patent is:

1. In a milk bottle receptacle, a pair of bottle base supports, a pair of sliding shafts, a pair of arms pivoted to said shafts arranged above each of said supports, a plurality of sets of tumblers, a plurality of levers connected to said sets of tumblers and extending through said base supports, means for simultaneously forcing said tumblers downwardly and the free ends of said levers upwardly into engagement with the bottom of the milk bottle, means connected to said shafts adapted to be forced into the slots of one of said sets of plungers when its corresponding shaft is moved outwardly and its pair of pivoted arms closed.

2. In a milk bottle receptacle, a casing, a plurality of notched tumblers within said casing, a pair of bottle base supports having an opening in communication with the casing, levers attached to said tumblers having curved ends adapted to extend through said opening to engage the bottom of a bottle, tube like extensions above said base supports, shafts slidably mounted in said extensions, a horizontally disposed bar in said casing pivoted to the inner ends of the said shafts, and bottle engaging arms pivoted to the outer ends of the said shafts, substantially as described.

3. In a milk bottle receptacle, a casing, base supports for the bottom of the bottles, pivoted arms engaging the neck of the bottles, locking devices for said arms including tumblers and curved levers attached to said tumblers adapted to engage the recess in the bottom of the milk bottle whereby the removal of one bottle cannot be effected except by replacing another bottle having a determined bottom contour in position.

4. In a milk bottle receptacle having a pair of base supports, a pair of sliding shafts, a pair of arms pivoted to said shafts over each of said base supports, a pivoted bar connected to said shafts, slotted tumblers, means connected to said tumblers at one end and adapted to engage the bottom of a bottle at the other end whereby when a bottle is inserted said levers will bring the notches in said tumblers into alinement to receive one end of said pivoted bar.

5. In a milk bottle receptacle, a pair of base supports and a pair of neck supports for the bottles, means whereby a bottle cannot be removed from one of said necks and base supports except when another bottle having the same bottom contour is inserted in the other of said neck and base supports, said means including tumblers and curved levers attached to said tumblers adapted to engage the bottom of the bottle.

In testimony whereof I affix my signature in presence of two witnesses.

JOHN ROBERT CASPER.

Witnesses:
JOHN H. SIGGERS,
PERCY H. MOORE.